(12) United States Patent
Provost

(10) Patent No.: US 8,800,299 B2
(45) Date of Patent: Aug. 12, 2014

(54) JET ENGINE NACELLE HAVING DAMPERS FOR HALF-SHELLS

(75) Inventor: Fabrice Provost, Notre-Dame-du-Bec (FR)

(73) Assignee: Aircelle, Gonfreville l'Orcher (FR)

( * ) Notice: Subject to any disclaimer, the term of this patent is extended or adjusted under 35 U.S.C. 154(b) by 1192 days.

(21) Appl. No.: 12/673,933

(22) PCT Filed: Jul. 25, 2008

(86) PCT No.: PCT/EP2008/059760
§ 371 (c)(1),
(2), (4) Date: Apr. 6, 2011

(87) PCT Pub. No.: WO2009/024428
PCT Pub. Date: Feb. 26, 2009

(65) Prior Publication Data
US 2011/0173949 A1    Jul. 21, 2011

(30) Foreign Application Priority Data
Aug. 20, 2007    (FR) ...................................... 07 05939

(51) Int. Cl.
*F02C 7/20* (2006.01)
*B64D 27/00* (2006.01)
(52) U.S. Cl.
USPC .............................................. 60/796; 244/54

(58) Field of Classification Search
CPC .... B64D 2027/262; B64D 29/00; F23R 3/60; F02C 7/20
USPC ............. 60/796, 797, 798, 799; 244/53 R, 54
See application file for complete search history.

(56) References Cited

U.S. PATENT DOCUMENTS

| 4,683,717 A * | 8/1987 | Naud ............................ 60/226.1 |
| 4,920,744 A * | 5/1990 | Garcia et al. ................. 60/226.1 |
| 2003/0192987 A1 | 10/2003 | Ahrendt et al. |
| 2004/0238687 A1 | 12/2004 | Jones et al. |

OTHER PUBLICATIONS

International Search Report; PCT/EP2008/059760; Aug. 26, 2008.

* cited by examiner

*Primary Examiner* — Gerald L Sung
(74) *Attorney, Agent, or Firm* — Brinks Gilson & Lione

(57) ABSTRACT

A jet engine nacelle includes an air intake section, a middle section, and an aft section. The aft section is formed from two half-shells rotatably mounted such that they can each be deployed between a working position and a maintenance position under the action of a jack and a telescopic connecting rod each respectively having a first end fastened on the jet engine and a second end fastened in the corresponding half-shell. In particular, the nacelle includes at least one damping member arranged between each telescopic connecting rod and the corresponding half-shell, and the damping member is designed so as to be in a prestressed state when the corresponding half-shell is in the working position and can reduce vibration in the half-shell.

7 Claims, 2 Drawing Sheets

JET ENGINE NACELLE HAVING DAMPERS FOR HALF-SHELLS

TECHNICAL FIELD

The invention relates to a jet engine nacelle of an aircraft.

BACKGROUND

An aircraft is propelled by a plurality of jet engines each accommodated in a nacelle that also houses a set of additional actuating devices linked to the operation thereof and providing various functions when the jet engine is operating or has stopped. These additional actuating devices particularly comprise a mechanical system for actuating thrust reversers.

A nacelle generally has a tubular structure comprising an air intake in front of the jet engine, a mid-section intended to surround a fan of the jet engine, an aft section that can house thrust reversal means and is intended to surround the combustion chamber of the jet engine, and generally ends with an ejector nozzle, the outlet of which is located downstream of the jet engine.

Modern nacelles are often intended to house a turbofan engine that can generate, via the rotating fan blades, a warm airflow (also called primary flow) coming from the jet engine combustion chamber.

A nacelle generally has an external structure, called an Outer Fixed Structure (OFS), which defines, with a concentric internal structure, called an Inner Fixed Structure (IFS), including a cowl surrounding the actual structure of the jet engine at the rear of the fan, an annular flow channel, also called a duct, the purpose of which is to channel a cold airflow, called secondary flow, which circulates outside the jet engine. The primary and secondary flows are ejected from the jet engine via the rear of the nacelle.

Each propulsion assembly of the airplane is therefore formed by a nacelle and a jet engine, and is suspended on a fixed structure of the airplane, for example under a wing or on the fuselage, via a pylon or strut attached to the jet engine or to the nacelle.

The aft section of the external structure of the nacelle is normally formed from two half-shells having a substantially semi-cylindrical shape, on either side of a longitudinal vertical plane of symmetry, and which are movably mounted such that they can be opened out between a working position and a maintenance position with a view to giving access to the jet engine.

The two half-shells are generally mounted in a pivoting manner about a longitudinal shaft forming a hinge at the upper part (at 12 o'clock) of the reverser. The half-shells are kept in the closed position by means of locks arranged along a junction line located at the lower part (at 6 o'clock).

Each half-shell is opened using at least one jack and is kept open using at least one telescopic connecting rod, said jack and said telescopic connecting rod each having a first end fastened generally on the jet engine and a second end fastened in a forward frame of said half-shell, this forward frame being the member that attaches the aft section to a fixed part of the mid-section of the nacelle.

Yet, it has been noted that a telescopic connecting rod can lose all or some of the structural and functional capacities thereof when it is subjected to the vibrations generated by the engine during a certain period of time.

It is already known to incorporate compression springs into the body of the telescopic connecting rod so as to dampen these vibrations. Nevertheless, this type of telescopic connecting rod has a certain number of disadvantages.

Firstly, the operator must exert considerable compressive forces when installing this telescopic connecting rod, which, in the end, makes the operation difficult.

Furthermore, this telescopic connecting rod must be stored in the maximum amplitude position thereof as a result of the presence of an internal compression spring, hence a loss in storage space.

Furthermore, the incorporation of a compression spring requires an enlarged diameter of the body of the telescopic connecting rod, which results in an increase in mass and size.

BRIEF SUMMARY

The invention is intended to overcome all or some of the disadvantages stated above, and comprises, to this end, a jet engine nacelle comprising an air intake forward section, a mid-section intended to surround a fan of the jet engine, and an aft section formed from at least two half-shells rotatably mounted such that they can each be opened out between a working position and a maintenance position under the action of at least one jack and at least one telescopic connecting rod each respectively having a first end fastened on the jet engine and a second end fastened in the corresponding half-shell, characterized in that it comprises at least one damping member arranged between each connecting rod and said corresponding half-shell, said damping member being designed so as to be in a prestressed state when the half-shell is in the working position.

Therefore, providing a damping member external to the telescopic connecting rod enables any type of telescopic connecting rod to be used, particularly a standard telescopic connecting rod, the production cost of which is low and the storage of which only requires a minimum of space. Furthermore, it is no longer necessary to provide an enlarged diameter for accommodating the compression spring.

Advantageously, the second end of the jack and the second end of the connecting rod are fastened in a forward frame that is part of the corresponding half-shell.

According to a preferred embodiment of the invention, the damping member comprises a leaf spring.

Preferably, the leaf spring has a first end fastened in the corresponding half-shell and a second end pressing on the connecting rod.

Again preferably, the first end of the leaf spring is fastened in the forward frame.

BRIEF DESCRIPTION OF THE DRAWINGS

The present invention also relates, on the one hand, to a propulsion assembly comprising a nacelle according to the invention arranged around a jet engine, and on the other hand, to an aircraft comprising at least one such propulsion assembly.

The implementation of the invention shall be better understood from the detailed description given below with reference to the appended drawing in which.

DETAILED DESCRIPTION

Figure 1:
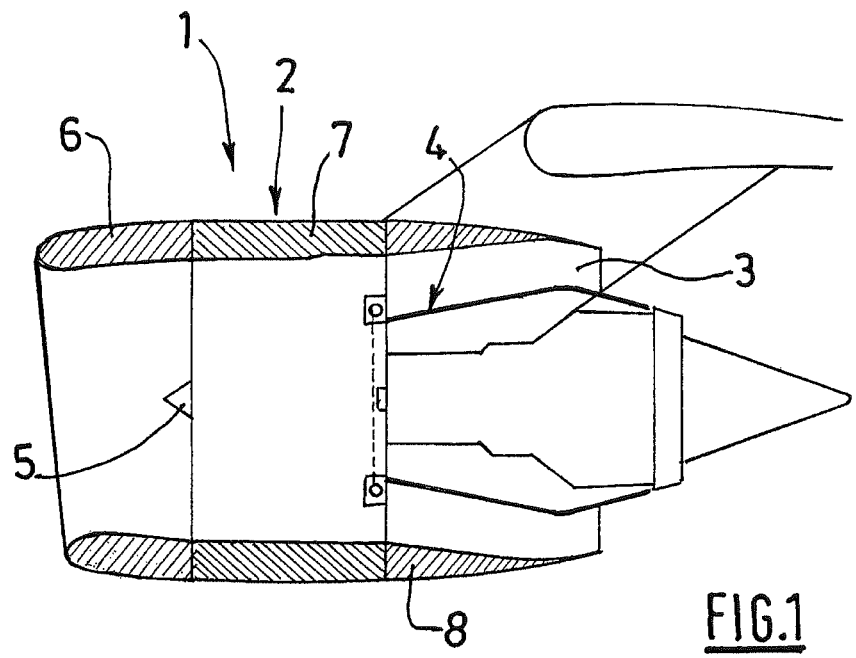
FIG. 1 is a longitudinal sectional schematic view of a nacelle according to the invention in the closed state.

A nacelle 1 of an aircraft according to the invention, as is shown in FIG. 1, comprises, in a manner known per se, an external structure 2, called an OFS, which defines an annular flow channel 3 with a concentric internal structure 4 surrounding the actual structure of the jet engine (not shown) at the rear of a fan 5.

More precisely, this external structure 2 is broken down into an air intake forward section 6, a mid-section 7 intended to surround the fan 5, and an aft section 8 formed from at least two half-shells 9.

Figure 2:
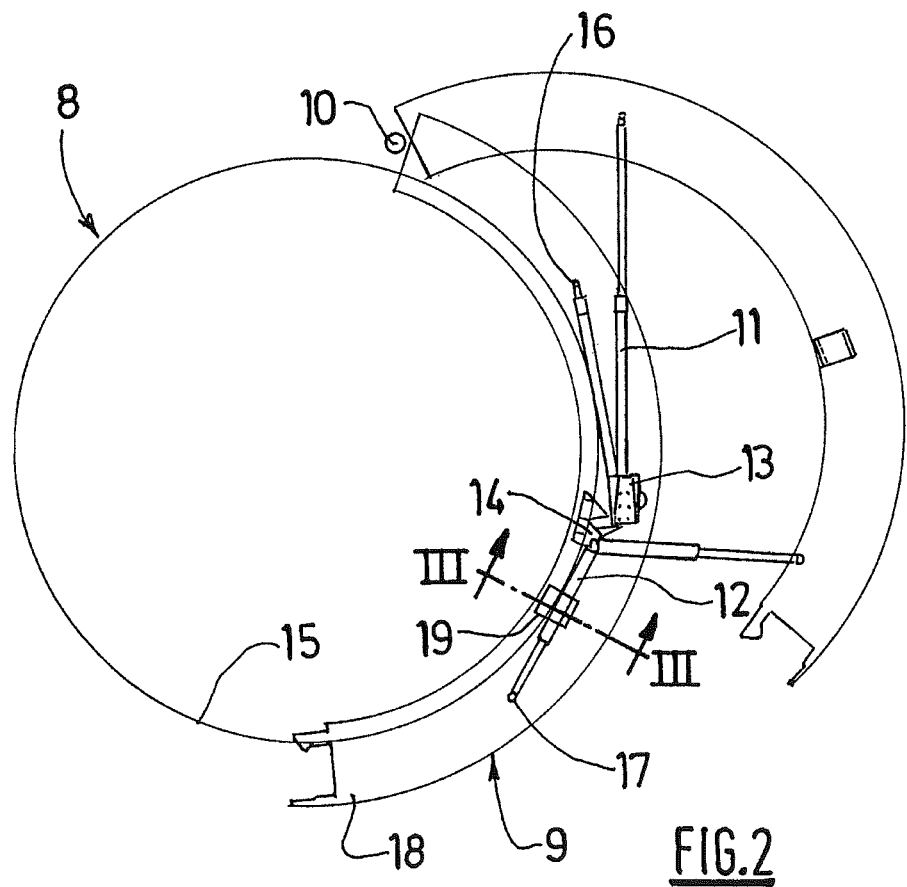
FIG. 2 is a cross-sectional partial schematic view of the aft section shown in FIG. 1, when a half-shell is in the working position and in the maintenance position respectively.
Figure 3:
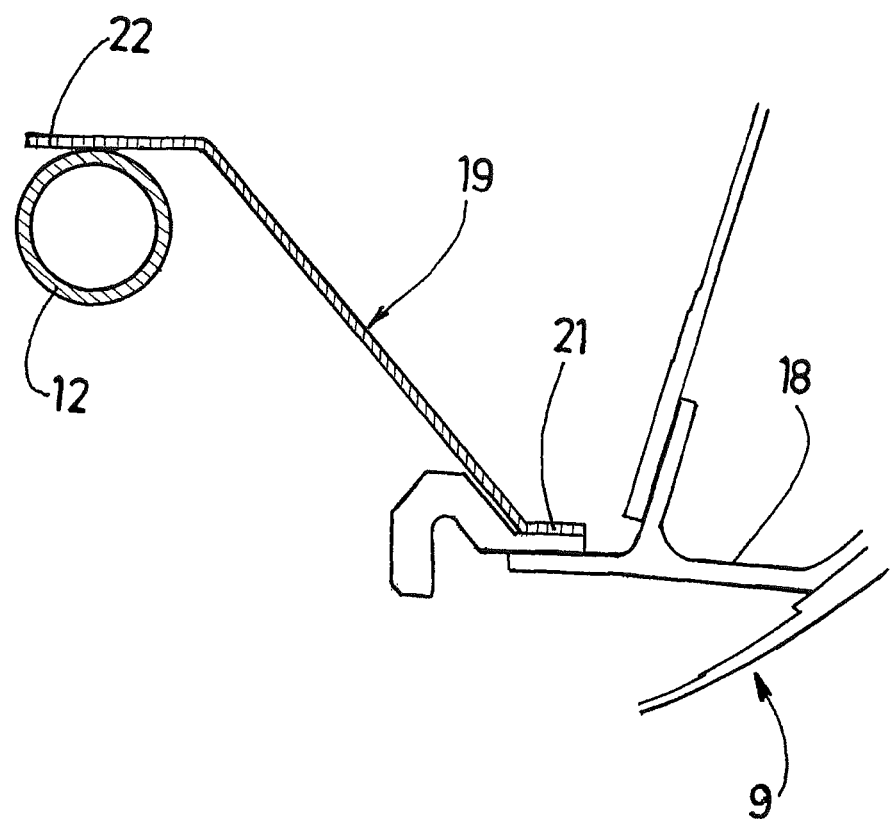
FIG. 3 is a sectional partial enlarged view along the line III-III of the aft section shown in FIG. 2.

As shown more specifically in FIGS. 2 and 3, each of the two half-shells 9 is rotatably mounted along a longitudinal shaft 10 located at the upper part (at 12 o'clock), such as to be able to move alternatively from a working position, where it is closest to the jet engine, to a maintenance position, where it is opened outwards, under the action of at least one jack 11 and at least one telescopic connecting rod 12 each respectively having a first end 13, 14 fastened in the jet engine, and a second end 16, 17 fastened in a forward frame 18 of the corresponding half-shell 9.

According to the invention, a damping member produced in the form of a leaf spring 19 is arranged between each connecting rod 12 and said corresponding half-shell 9. This leaf spring 19 has a first end 21 fastened in the forward frame 18, for example by bolting or by any other means available to a person skilled in the art, and a second end 22 pressing on the connecting rod 12.

In the working position, the two half-shells 9 are positioned closest to the jet engine, and are kept, in a conventional manner, in this position using a plurality of locks (not shown) provided along a junction line located at the lower part (at 6 o'clock).

The leaf spring 19 is designed so as to be in a prestressed state when the corresponding half-shell 9 is in the working position.

Therefore, when the half-shell 9 shown in FIG. 3 is in the working position, the leaf spring 19 is compressed between the connecting rod 9 and the forward frame 18.

As a result, the stresses to which the connecting rod 12 is subjected due to the vibrations generated by the jet engine are greatly reduced thanks to the presence of the leaf spring 19 which is constantly active.

Thus, providing a damping member 19 external to the telescopic connecting rod 12 enables any type of telescopic rod to be used, particularly a standard telescopic connecting rod, the production cost of which is low, and the storage of which only requires a minimum of space. Furthermore, it is no longer necessary to provide an enlarged diameter in order to accommodate the damping member 19.

Although the invention has been described with reference to specific exemplary embodiments, it is obvious that it is in no way limited thereto and that it comprises all of the technical equivalents of the means described and the combinations thereof if the latter fall within the scope of the invention.

The invention claimed is:

1. A jet engine nacelle comprising:
    an air intake forward section;
    a mid-section intended to surround a fan of the jet engine;
    an aft section formed from at least two half-shells rotatably mounted such that each of said at least two half-shells is opened out between a working position and a maintenance position under an action of at least one jack and at least one telescopic connecting rod each respectively having a first end fastened on the jet engine and a second end fastened in a corresponding half-shell; and
    at least one damping member arranged between each of the at least one telescopic connecting rod and said corresponding half-shell, said at least one damping member being be in a prestressed state when the corresponding half-shell is in the working position, said damping member being configured so as to reduce vibrations in the half-shell.

2. The nacelle as claimed in claim 1, wherein the second end of the at least one jack and the second end of the at least one telescopic connecting rod are fastened in a forward frame that is part of the corresponding half-shell.

3. The nacelle as claimed in claim 1, wherein the damping member comprises a leaf spring.

4. The nacelle as claimed in claim 3, wherein the leaf spring has a first end fastened in the corresponding half-shell and a second end pressing on the at least one telescopic connecting rod.

5. The nacelle as claimed in claim 4, wherein the first end of the leaf spring is fastened in the forward frame.

6. A propulsion assembly, comprising a nacelle as claimed in claim 1 arranged around a jet engine.

7. An aircraft, comprising at least one propulsion assembly as claimed in claim 6.

\* \* \* \* \*